H. G. CORDLEY.
SELF CLOSING FAUCET.
APPLICATION FILED JUNE 17, 1908. RENEWED JULY 15, 1910.
987,218.
Patented Mar. 21, 1911.
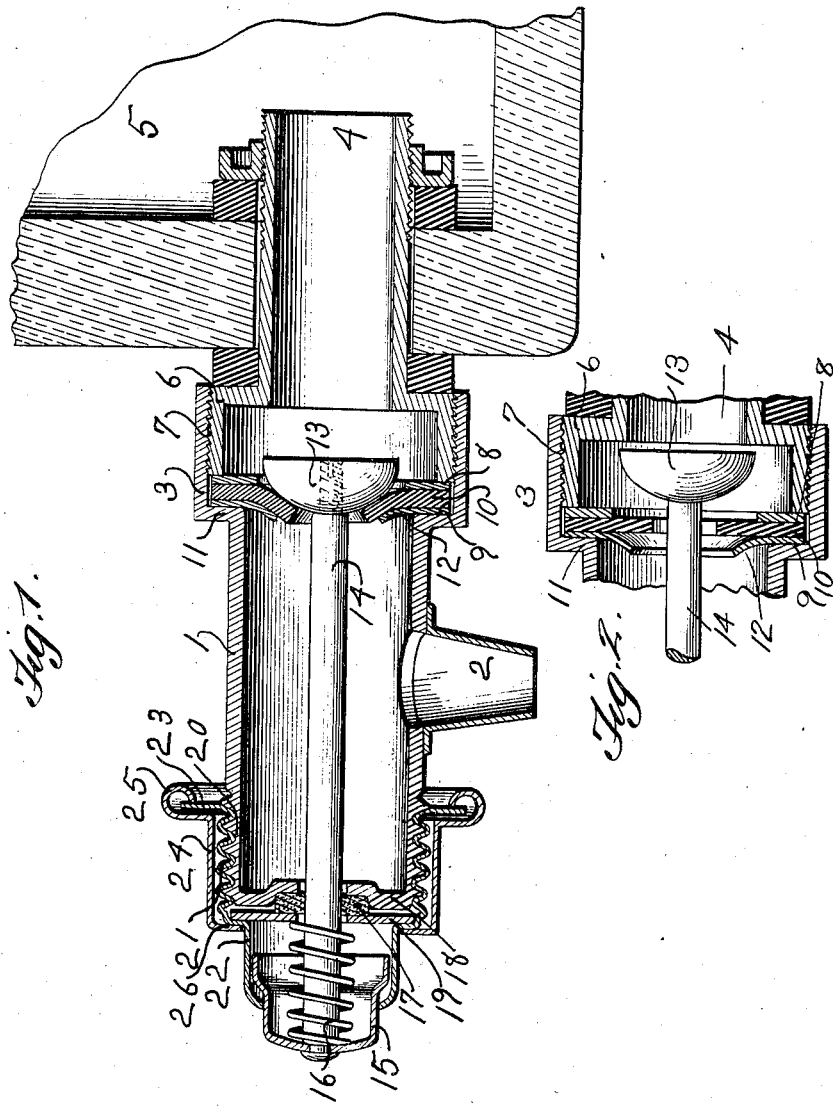
Witnesses
Inventor
Henry G. Cordley.
By
Attorney

UNITED STATES PATENT OFFICE.

HENRY GREELEY CORDLEY, OF GLEN RIDGE, NEW JERSEY.

SELF-CLOSING FAUCET.

987,218. Specification of Letters Patent. Patented Mar. 21, 1911.

Application filed June 17, 1908, Serial No. 438,957. Renewed July 15, 1910. Serial No. 572,200.

*To all whom it may concern:*

Be it known that I, HENRY GREELEY CORDLEY, a citizen of the United States, residing at Glen Ridge, in the county of Essex, State of New Jersey, have invented certain new and useful Improvements in Self-Closing Faucets, of which the following is a description, reference being had to the accompanying drawings, forming a part hereof.

My invention relates to self-closing faucets designed for use with water coolers or with other devices, and the object thereof is to provide a simple and effective self-closing faucet for the purpose specified and one that may be produced at a minimum cost.

The accompanying drawing illustrates an embodiment of my invention wherein—

Figure 1 is a longitudinal sectional view of my improved faucet taken upon a plane passing through the axis thereof, the valve and some of its operating parts being shown in elevation; and, Fig. 2 is a fragmentary view illustrating the position assumed by the valve seat when the valve is forced away therefrom.

In the drawing 1 is the body portion or casing of my improved faucet, and 2 is a spout through which liquid is discharged from the faucet. The body portion or casing 1 is enlarged at 3, and 4 is a nipple whereby the faucet is secured to a receptacle 5 designed to contain a liquid. The nipple 4 is enlarged at 6; and the enlarged portion 3 of the casing 1, and the enlarged portion 6 of the nipple 4 are threaded to engage with one another at 7 and hold the valve seat of the faucet between them as will be seen from the drawing.

The valve seat of my faucet comprises two annular disks 8 and 9 of metal, and an interposed similarly shaped disk 10 of flexible material such as rubber, the three being held in position between a shoulder 11 and the end of the enlarged portion 6 of the nipple 4. The metallic disk 9 is curved or dished at 12 to afford a surface without sharp corners or edges against which the flexible disk 10 rests when the valve 13 is seated, as shown in Fig. 1. When the valve 13 is forced from its seat to permit the flow of liquid from the receptacle 5 the flexible disk 10 leaves the dished portion of the disk 9 and assumes a position as illustrated in Fig. 2.

13 is a valve for establishing or interrupting the flow of liquid through my faucet, which valve seats upon the flexible disk 10 as above described. The valve 13 is carried by a stem 14, having a push button 15 whereby it is opened.

16 is a spring for seating the valve 13 and whereby the valve is held normally closed, and 17 is a packing surrounding the stem 14 and located between the closed end 18 of the casing 1 and a metallic disk 19 as shown in Fig. 1, which disk 19 is engaged and held in place by a shoulder formed in a threaded cap 21 upon the outer end of the casing 1.

The outer end of the casing 1 is threaded as at 20, and 21 is a threaded cap in engagement with the threads at 20 and having an extension 22 of reduced size which engages and forms a guide for the push button 15. The threaded cap 21 is also provided with a flange 23; and 24 is a cover or shield designed to conceal the threads of the cap 21 to produce a cap having a smooth external surface and a pleasing appearance. This shield 24 is formed with an outwardly extending rolled flange 25 at its inner end to engage the flange 23 of the threaded cap 21, and with an inwardly extending flange 26 to engage a shoulder at the inner end of the reduced extension 22 of the cap 21. By this construction it will be seen that the shield 24 is securely attached to the threaded cap 21 and serves to conceal the threads thereof.

The threaded cap 21 and the shield 24 are formed from thin metal preferably by the process of spinning, and it will be understood that one or both the flanges 25 and 26 of the shield 24 are spun or otherwise forced into their final form after the shield has been put in place, whereby a cap comprising a single unitary structure is produced.

Having thus described my invention and explained the mode of operation thereof, I claim and desire to secure by Letters Patent:—

1. In a self-closing faucet, a casing provided with an enlarged inner end, and with a shoulder adjacent said enlarged end; a nipple whereby said casing may be secured to a suitable receptacle, said nipple having its outer end enlarged and secured within the enlarged inner end of said casing; a valve seat within the enlarged inner end of said casing and secured in place between the enlarged end of said nipple and said shoulder and comprising an annular metallic disk, an annular disk of flexible material, and a second annular metallic disk, said disk of flexible material being located between said metallic disks and said second metallic disk being curved or dished; a normally closed valve adapted to force said flexible disk against said dished metallic disk when said valve is closed; and a spring for closing said valve.

2. In a self-closing faucet, a valve seat comprising an annular metallic disk, an annular disk of flexible material, and a second annular metallic disk, said disk of flexible material being located between said metallic disks and said second metallic disk being curved or dished; a valve adapted to force said flexible disk against said dished metallic disk as said valve closes; and a spring for closing said valve.

3. In a self-closing faucet, a casing closed at its outer end and provided with an opening for a valve stem and provided also with a thread at its outer end; a threaded cap in engagement with said threaded outer end and having a shoulder and a reduced outwardly extending portion; a disk engaged by said shoulder and having an opening for a valve stem; a packing between said disk and the end of said casing; a valve stem extending through said openings; a push button upon the outer end of said stem and engaged with and guided by the reduced outwardly extending portion of said cap; a spring between said disk and said push button and tending to force said push button outward; a valve upon the inner end of said stem; and a seat for said valve.

4. In a faucet, a cap having a threaded portion, a flange formed upon said cap at one end of the threaded portion thereof; a shoulder formed upon said cap at the other end of the threaded portion thereof; a shield for covering and concealing said threaded portion; and flanges at each end of said shield and adapted to engage the flange and the shoulder upon said threaded cap, whereby said shield is held in position over said threads.

This specification signed and witnessed this tenth day of June A. D. 1908.

HENRY GREELEY CORDLEY.

In the presence of—
GEORGE B. WILLIAMS,
W. M. REIS.